June 4, 1963 A. S. HOAGLAND 3,092,814

SIGNAL DECODING SYSTEM

Filed Aug. 29, 1956

INVENTOR.
Albert S. Hoagland
BY John B. Clark
Attorney 3,092,814

SIGNAL DECODING SYSTEM

Albert S. Hoagland, Palo Alto, Calif., assignor to International Business Machines Corporation, New York, N.Y., a corporation of New York Filed Aug. 29, 1956, Ser. No. 606,924
4 Claims. (Cl. 340—174.1)

Figures 1, 2:
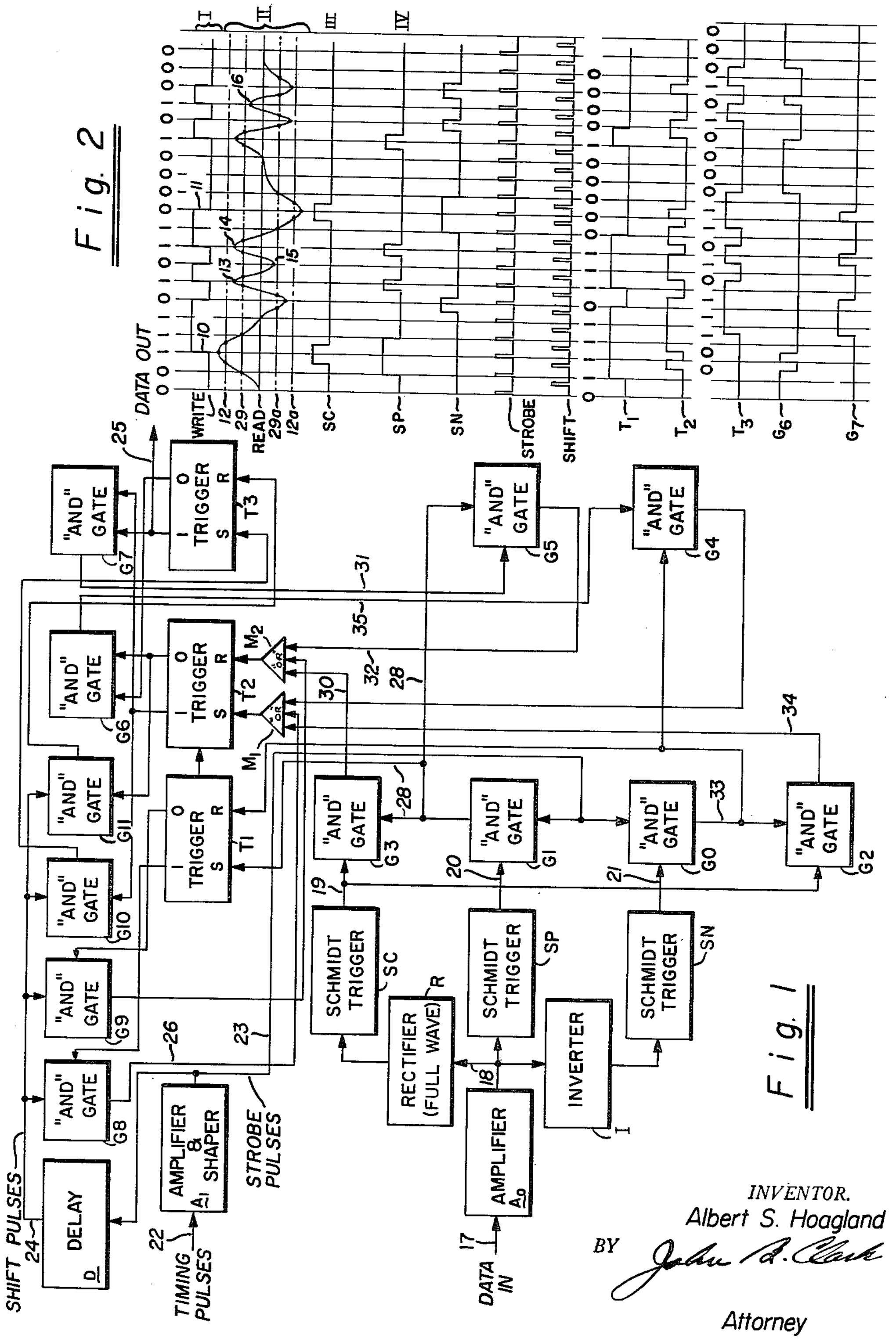

The present invention pertains generally to signal decoding devices and relates more particularly to a circuit for interpreting signals generated by magnetically recorded data, which circuit utilizes inherent characteristics of the signal to effect corrections when necessary.

Generally, the embodiment of the invention discussed herein is directed to a circuit adapted for use in connection with the NRZ (non-return to zero) type of magnetic recording, although it will be obvious to those skilled in the art that the teaching of this invention is not limited to NRZ recording but is equally applicable to other forms of magnetic recording. NRZ recording utilizes the opposite senses of surface saturation for representing the binary bits and, conventionally, the surface is uniformly saturated in one direction for binary "1's" and in the opposite direction for binary "0's." Hence, the direction of saturation is reversed at each change in bit sequence. Since read-back essentially involves a derivative type of action, an output signal is associated only with each change in the sense of saturation. The invention incorporates a logical correction feature which is based upon the knowledge that the read-back waveform has an inherent alternating characteristic.

Thus, an object of the invention is to provide an improved signal decoding circuit.

Another object is to provide a novel decoding circuit for providing necessary corrections in the data passing therethrough.

A further object is to provide a decoding circuit having a novel error correcting means wherein corrections to data passing therethrough are made on the basis of the predetermined characteristics of the data signals.

Normally, on reading magnetically recorded data, amplitude detection is used to form a pedestal or pulse throughout some interval of signal peaks determined by the read signal and by the established clipping level and strobes aligned with signal peaks are applied to gates in conjunction with the pedestals to determine during each bit interval whether or not a signal is present. The clipping level used in sensing the pulse peaks is chosen to allow reading of the signal variations, and if the bit density is increased, assuming a constant clipping level, the following sources of error arise. The first (case I) is where there is an isolated change in bit sequence. When the bit density is increased, the read-back waveform remains the same, and since separation between adjacent strobes decreases with an increase in bit density, strobes adjacent the desired or correct one are gated by the pedestal formed from the waveform, resulting in an error. Secondly (case II), a sequence of changes in the binary pattern results in overlapping magnetization, with high bit densities, and this results in the reduction of the amplitude of the signal peaks. If such peaks lie below the clipping level, they will be missed, causing an error. The present invention is arranged to correct both of these sources of error, since any adjustment of the clipping level to avoid one increases the likelihood of the other.

Thus, another object of the invention is to provide a novel reading circuit which permits storage of data at higher bit densities.

A still further object of the invention is to provide a circuit for correcting each of the types of error mentioned above.

Other objects of the invention will be pointed out in the following description and claims and illustrated in the accompanying drawings, which disclose, by way of example, the principle of the invention and the best mode which has been contemplated of applying that principle.

In the drawings:

FIG. 1 is a schematic block diagram of an embodiment of the invention.

FIG. 2 comprises a plurality of waveforms representative of signals discussed in connection with the operation of the invention.

Referring now to FIG. 2, wave pattern II, a read signal representative of the binary sequence

0011101011000010100 is shown, and the circuit of the invention is discussed herein in connection with its operation when such a waveform is entered therein. When there is an isolated change in bit sequence as shown at 10 and 11 (FIG. 2, wave pattern I), it will be understood that the wrong strobes as well as the right strobes may be gated by the read waveform, if the clipping level used to detect signal peaks is too low. This type of error, a case I error, may be avoided by raising the clipping level; however, when the clipping level is raised, the result may be that the smaller peaks such as 13 and 14 are lost, causing other errors.

Case II errors result from the clipping level being too high. From FIG. 2, wave pattern II, it can be seen that even when the lower clipping level indicated at 29 is used, intermediate peaks, such as those at 15 and 16 of a sequence of alternate peaks, are lost. Thus, case I errors tend to limit the lower setting of the clipping level and case II errors limit the upper setting. For a given bit density the present device increases the usable clipping ratio by extending both the upper and the lower limits by providing corrections for both case I and case II errors.

Assume that the positive portion of the read-back waveform is given the designation P and, similarly, that N applies to the negative portion. Thus, the P channel refers to the information path which responds to the positive portion of the input waveform. It will be recalled that the present invention is directed to a circuit for use in connection with the NRZ type of magnetic recording. In this case the read signal has an inherent alternating characteristic since these signals result only from a change in the direction of magnetization. Thus, using the conventional strobing technique, which samples the signal once each bit interval, the following results obtain: (1) Only one of two successive strobes will be gated by the same channel (P or N). (Adjacent strobes gated by the same channel must be differentiated as only one strobe can indicate the presence of a signal without error.) (2) An alternate strobe sequence gated by the same channel indicates that a strobe should have been gated by the opposite channel at the intervening strobe time unless in error.

The circuitry for the correction of case I errors (isolated bit sequence) utilizes an additional amplitude-sensitive element which effects a zoning type action to locate the signal peak more precisely. The reception of two adjacent gated strobes on either channel is resolved in favor of the one corresponding most closely to the signal peak. This selection is accomplished by providing a second, higher clipping level, as at 12 in FIG. 2, wave pattern II. The only restriction placed on this clipping level is that it isolate the desired strobe. The adddition of this clipping level allows the correct stroke to be identified, and hence the circuit may logically interpret the signal information and correct errors of this type.

The correction for missing a sequence change is also entirely logical. If, where $t_i$ is the instant time of a signal $t_{i-1}$ is the time one instant before the signal and $t_{i+1}$ is the time one instant after the signal, the P channel reads a "1" at time $t_{i-1}$ and no strobe is gated at time $t_i$, then if the P channel again reads a "1" at $t_{i+1}$ it is immediately known that $t_i$ corresponds to a "0."

Referring now to FIG. 1, the circuit for accomplishing the corrections discussed above is illustrated in block form. Since each of the components shown is well known and is commonly used by those familiar with the art, the detailed circuitry represented by these blocks will not be given and it is felt that a statement regarding the function of each such block will suffice to yield a clear understanding of the invention.

Data taken from a magnetic record (not shown) via a suitable transducer (also not shown) is entered on a line 17 which connects through a suitable amplifier A0 to a line 18. The amplified data is then transmitted by the line 18 along three paths. One path is directly to a Schmidt trigger SP; another is through an inverter I to a Schmidt trigger SN; and the third is through a full wave rectifier R to a Schmidt trigger SC. The units SN and SP are arranged to operate in response to signals exceeding the clipping level represented by the line 29 and line 29*a* (FIG. 2, wave pattern II), and the unit SC operates at signals exceeding the clipping level represented by the line 12 and line 12*a* in FIG. 2, wave pattern II. Thus, a line 19 (FIG. 1) connected to the output of the SC unit goes up for a short time during each peak corresponding to an isolated change in the bit sequence and lines 20 and 21 rise when the signal level of the corresponding positive and negative peaks exceeds the clipping level of their associated SP or SN unit.

Timing pulses arranged to coincide with signal peaks are applied through a line 22 (FIG. 1) and through an amplifier and pulse shaper A1 to a strobe line 23, which line is connected to the input of a delay unit D as well as to one input of each of two "and" gates G0 and G1. The unit D is provided to delay the strobes taken from the amplifier A1 for forming shift pulses on a line 24 connected to the output of the delay unit, which line is connected to one input of each of four "and" gates G8, G9, G10 and G11. Pulses taken from the line 24 are utilized to operate a shift register comprising three triggers T1, T2 and T3 in the conventional manner, as will be briefly described hereinafter.

Data taken from the input line 17 operates the units SC, SP and SN according to the polarity and magnitude of the data signals and the units SP and SN are arranged to enter this data into the first stage T1 of the shift register. The data entered in this trigger may include the errors mentioned above, and this data, including errors, is shifted during the following shift time into trigger T2 where the errors are corrected. After correction the data is shifted into T3 from where it is taken, after a 1½ bit delay, to an output line 25 for use as may be desired.

The shift register comprising the triggers T1, T2 and T3 is operated to shift the data stored therein to the next succeeding trigger or to the line 25, as the case may be, upon receipt of shift pulses taken from the line 24. When the data is shifted from one trigger to the next, the trigger from which the data is taken is not reset but is left in the condition in which it was prior to shift time. That is, when a "1" is present in trigger T1, i.e., when the output line associated with the "1" tap of the unit T1 is high, this "1" is entered into T2 at shift time since at this time both inputs to the "and" gate G8 are high and since the output of the unit G8 is connected by a line 26 through a mixer or "or" gate M1 to the S or "set" tap of the unit T2, thereby setting T2 and entering a "1" therein. This causes the "1" tap of T2 to go up. In the case where a "0" is stored in the unit T, the "0" tap thereof is high and the next shift pulse resets the trigger T2 through the gate G9 and a mixer M2 in a similar manner, thereby raising the "0" tap of T2.

Assuming that data is recorded magnetically on a record according to the write signal shown in FIG. 2, wave pattern I, a read signal similar to that shown in line 2 will be applied through the line 17 (FIG. 1) to the amplifier A0. Normally, when no correction is necessary, the strobes are gated by SP and SN pulses to set or reset T1 according to the signal. However, when an isolated change in bit sequence is sensed, thereby rendering an error of the case I variety possible, both the SP and SC units (or SN and SC units, as the case may be) are operated by the signal resulting from this change (see FIG. 2, wave patterns III and IV). This is the case where the strobes on both sides of the correct one are gated by the SP (or SN) pulse (this includes the case where an adjacent pair of strobes are gated). If a bit sequence of 011 is assumed, where the zero is first in time, and if it is also assumed that $t_i$ corresponds to the strobe time associated with the change in sequence, then if the strobe at $t_{i-1}$ sets T1 an error has occurred and the register reads 100 from left to right. After shift time $t_{i-1}$ the register reads 110, thereby carrying the error into T2. At strobe time $t_i$ both gates G1 and G3 are open, and while T1 remains unchanged, T2 is reset by the stroke taken from G3 via a line 30, through the mixer M2 to the R tap of T2. Then, just prior to shift time $t_i$ the register correctly reads 100 from left to right and after the shift the register correctly indicates 110. Thus, data at bit time $t_{i-1}$ is correctly interpreted as a "0" and is entered in T3 1½ bit times later at shift time $t_i$.

Errors of the case II variety are corrected with the aid of gates G4, G5, G6 and G7 as well as gates G0 and G1. It will be recalled that errors of this type involve a missed change in sequence. Assuming that the recorded data is 101 (see FIG. 2, wave pattern II) and that the clipping level is too high to permit the "0" signal to fire the Schmidt trigger SN, without the correction feature the data would be entered in the register as 111. However, whenever the P channel reads "1's" on either side of a strobe time and no strobe is gated at this strobe time, a "0" is inserted for that strobe time. The initial "1" is entered in T1 (FIG. 1) by the strobe passing through G1 and is shifted into T2 at the corresponding shift time, i.e., at shift time $t_{i-1}$. On the following strobe time $t_i$ nothing happens since the "0" is not sensed and the "1's" in T1 and T2 are shifted into T2 and T3, respectively, at shift time $t_i$, thereby leaving the register in the condition 111. At strobe time $t_{i+1}$ another "1" is read, and since gate G5 is open at this time (G5 is open when "1's" are present in both T2 and T3) the strobe passing through G1 also passes through G5 to reset T2, thereby causing the register to correctly indicate 101. A similar result would have been obtained had the sequence been 010; however, gate G4 would have been opened to pass the strobe gated by SN for setting the trigger T2 instead of resetting it. Again it will be noted that the correct data is entered in T3 and it may be taken from the line 25 1½ bit time delayed.

It should be noted that the operation of G2 and G3 is not critical since logically every time T1 is set to the detection of a "1" in the P channel T2 should be in the "0" state. This merely represents the fact that the input wave is alternating and each pulse should gate only one strobe.

Normally, the actual setting of the SP and SN triggering levels is chosen to allow the greatest change in signal amplitude about a nominal value. Such variations in signal strength arise from changes in amplifier gain, head spacing, etc., and the allowable tolerance is indicated by the operative triggering ratio on a standard signal. The justification for continuing to use only the triggering ratio of the SP (or SN) Schmidt trigger as a measure for reliability or workable bit density with the decorder is the following. The setting of SC is non-critical although the triggering level should be properly chosen with reference to the level of SP (or SN). Weak signals may result in no operation of SC, but this situation implies that the pedestal width of SP and SN is considerably reduced so that the correction feature is not required. Similarly, for signals larger than the nominal amplitude SC will always define the pulse peak more accurately than the other triggers.

The operation of this circuit does not introduce sources of error not formerly present as it does not use any modified form of signal but retains amplitude-sensitive detection. Further, it is capable of correcting errors, based not upon a complicated sampling process but rather upon logic by merely recognizing the inherent nature of the recorded signal. All logical information concerning the waveform is preserved by utilizing the P and N channels.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a circuit for decoding positive and negative signals representing polarity changes, first sensing means responsive to positive signals exceeding a first amplitude, second sensing means responsive to negative signals exceeding said first amplitude, third sensing means responsive to positive and negative signals exceeding a second higher amplitude, means for simultaneous periodic sampling of said first, second and third sensing means, and means for deriving a decoded data signal from said sampling means whereby the larger of adjacent signals having like polarity is selected.

2. The device of claim 1 wherein the means for deriving a decoded data signal includes, means responsive to the sampled output of said third sensing means for suppressing adjacent signals having like polarity from said first and second sensing means.

3. In a circuit for decoding positive and negative signals representing polarity changes, first sensing means responsive to positive signals exceeding a first amplitude, second sensing means responsive to negative signals exceeding said first amplitude, means for simultaneous periodic sampling of said first and second sensing means, and means for deriving a decoded data signal from said sampling means including means for determining the polarity of an intermediate signal when like polarity signals are indicated by the sampled signals for intervals adjacent said intermediate interval.

4. A device according to claim 3 wherein said last mentioned means comprises means for indicating a signal of opposite polarity when like polarity signals are indicated by the sampled signals for intervals adjacent said intermediate interval and the signal for said intermediate interval is less than said first amplitude.

References Cited in the file of this patent

UNITED STATES PATENTS

| | | |
|---|---|---|
| 2,625,822 | Nichols | Jan. 20, 1953 |
| 2,855,513 | Hamburgen et al. | Oct. 7, 1958 |
| 2,887,676 | Hamilton | May 19, 1959 |
| 2,889,467 | Endres | June 2, 1959 |

FOREIGN PATENTS

| | | |
|---|---|---|
| 743,416 | Great Britain | Jan. 18, 1956 |

OTHER REFERENCES

"Techniques for Increasing Storage Density of Magnetic Drum Systems" (Fuller et al.), Proceedings of the Eastern Joint Comp. Conference, Dec. 8–10, 1954, pp. 16–21.